W. WEUSTHOFF.

Grain-Drills.

No. 5,889. Reissued May 26, 1874.

Witnesses:
A. Ruppert.
C. M. Connell

Inventor:
William Weusthoff
By his Attorneys
Blanchard & Robinson

AM. PHOTO-LITHOGRAPHIC Co. N.Y. (OSBORNE'S PROCESS.)

UNITED STATES PATENT OFFICE.

WILLIAM WEUSTHOFF, OF DAYTON, OHIO, ASSIGNOR TO THE FARMER'S FRIEND MANUFACTURING COMPANY, OF SAME PLACE.

IMPROVEMENT IN GRAIN-DRILLS.

Specification forming part of Letters Patent No. 92,679, dated July 13, 1869; reissue No. 5,889, dated May 26, 1874; application filed April 11, 1874.

*To all whom it may concern:*

Be it known that I, WILLIAM WEUSTHOFF, of Dayton, in the county of Montgomery and State of Ohio, have invented certain new and useful Improvements in Grain-Drills; and I do hereby declare that the following is a full, clear, and exact description thereof, reference being had to the accompanying drawing forming a part of this specification, in which—

Figure 1:
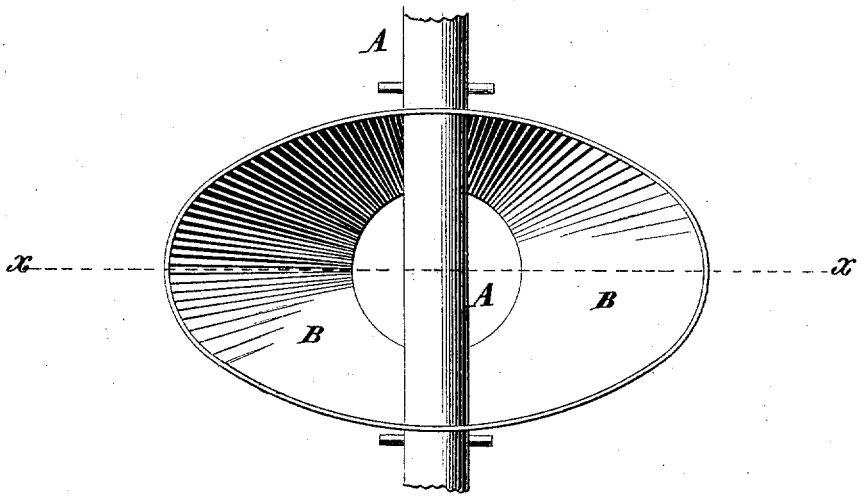
Figure 2:
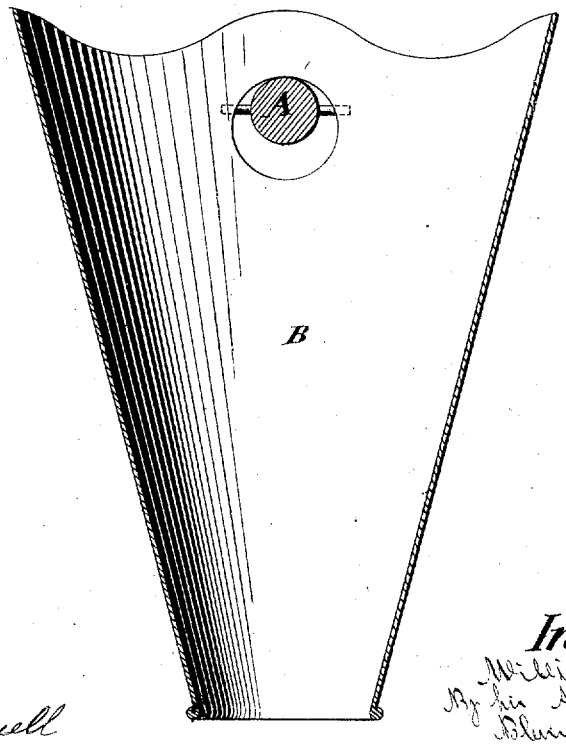

Figure 1 is a plan view of my improvement, and Fig. 2 is a vertical central section of the same on the line *x x* of Fig. 1.

My invention relates to a class of grain-drills in which the hoes are so arranged as to permit them to be placed in one line, or in two parallel lines, as may be desired; and it consists in the form and the manner of suspension of the funnels which conduct the grain from the hopper or grain-box to the hoes, by means of which the operation of changing the hoes from a single to a double rank, or the reverse, is greatly facilitated.

In drills as ordinarily constructed, the grain is discharged from the hopper or grain-box into a trough or oblong box situated beneath said hopper, which trough or box extends downward and to the front or rear to the tube-boards, so as to communicate with the rubber tubes discharging into the hoes, and consequently, when it becomes necessary to change said hoes from a single to a double rank, it is necessary to reverse one-half the number of said boxes or troughs in the tube-boards, whereby the operation is rendered both tedious and disagreeable, and by reason of the frequent changes necessary, the boxes or troughs are often deranged or broken. To obviate the above-recited and other difficulties is the object of my present improvement, which is fully illustrated in the annexed drawings, in which—

A represents a portion of the seed-wheel shaft, which is to be suitably journaled in bearings, so as to permit it to revolve freely. Suspended upon or from said shaft, immediately beneath each seed-wheel cup, is a funnel, B, the sides of which are compressed, so as to give it a width in line with the shaft, sufficient only for the reception of said seed-wheel cup, while its length in the direction of the path in which the machine moves when in operation is much increased. In order that as the hoes are changed from a single to a double rank, the grain which is passing through those which have had their positions changed shall not be thrown outside thereof by the movement of the seed-wheel, the lower ends of these funnels correspond in size and shape with the rubber tubes, which are to be attached thereto so as to be moved with said funnels as the hoes are changed from a single to a double rank, or the reverse.

It will be observed that as constructed and suspended the funnels can be turned to the front or rear for the purpose of conveying grain to the hoes or drills, and that they will operate equally well in either position, and that the manner of suspending said funnels upon or from the shaft renders it almost certain that no derangement thereof can take place.

Having thus described my invention, what I claim, and desire to secure by Letters Patent, is—

1. The funnels B of a grain-drill, for conducting the grain from the hopper or grain-box to the hoes suspended upon or from the seed-wheel shaft of such machines.

2. The funnels B of a grain-drill, for conducting the grain from the hopper or grain-box to the hoes, constructed in an oval or oblong form, for the purpose of causing them to conduct the grain to the hoes, whether said hoes are placed in single or double rank, as set forth.

WILLIAM WEUSTHOFF.

Witnesses:

GEO. M. YOUNG,

E. H. JONES.